United States Patent
Kim

(10) Patent No.: US 10,855,900 B2
(45) Date of Patent: Dec. 1, 2020

(54) DATA MANAGEMENT DEVICE AND METHOD FOR MANAGING DATA

(71) Applicant: HANWHA TECHWIN CO., LTD., Seongnam-si (KR)

(72) Inventor: Kyung Ho Kim, Changwon-si (KR)

(73) Assignee: HANWHA TECHWIN CO., LTD., Seongnam (KR)

( * ) Notice: Subject to any disclaimer, the term of this patent is extended or adjusted under 35 U.S.C. 154(b) by 228 days.

(21) Appl. No.: 15/471,156

(22) Filed: Mar. 28, 2017

(65) Prior Publication Data

US 2018/0160024 A1    Jun. 7, 2018

(30) Foreign Application Priority Data

Dec. 6, 2016  (KR) .................. 10-2016-0164905

(51) Int. Cl.
| | | |
|---|---|---|
| *H04N 5/232* | (2006.01) | |
| *H04N 1/00* | (2006.01) | |
| *H04N 1/21* | (2006.01) | |
| *H04N 7/18* | (2006.01) | |
| *H04N 5/247* | (2006.01) | |

(52) U.S. Cl.
CPC ..... *H04N 5/23203* (2013.01); *H04N 1/00251* (2013.01); *H04N 1/2129* (2013.01); *H04N 5/247* (2013.01); *H04N 7/181* (2013.01)

(58) Field of Classification Search
CPC ........... H04N 5/23203; H04N 1/00251; H04N 1/2129; H04N 7/181
USPC ........................................ 348/207.11, 231.2
See application file for complete search history.

(56) References Cited

U.S. PATENT DOCUMENTS

| | | | | |
|---|---|---|---|---|
| 2004/0058716 A1* | 3/2004 | Son | ....................... | H04N 1/2112 455/566 |
| 2005/0213147 A1* | 9/2005 | Minatogawa | ..... | G06F 17/30244 358/1.15 |
| 2005/0237391 A1* | 10/2005 | Shibuya | ............... | G11B 27/031 348/207.1 |
| 2007/0047950 A1* | 3/2007 | Asami | ................ | H04N 1/00347 396/429 |
| 2007/0115373 A1* | 5/2007 | Gallagher | ............... | G06F 16/58 348/231.3 |
| 2009/0091638 A1* | 4/2009 | Nakamura | .............. | G06T 11/00 348/222.1 |
| 2009/0096877 A1* | 4/2009 | Kunishige | .............. | G03B 17/14 348/207.11 |
| 2010/0278396 A1* | 11/2010 | Mitsuhashi | ....... | G06F 17/30247 382/118 |

(Continued)

FOREIGN PATENT DOCUMENTS

| | | |
|---|---|---|
| JP | 3005536 B1 | 1/2000 |
| JP | 2007-166143 A | 6/2007 |
| JP | 2015-177394 A | 10/2015 |

*Primary Examiner* — Sinh Tran
*Assistant Examiner* — Zhenzhen Wu
(74) *Attorney, Agent, or Firm* — Sughrue Mion, PLLC

(57) ABSTRACT

A data management device and a method of managing data are provided. The data management device includes a communication interface configured to receive image data from cameras, and a data manager configured to sort predetermined cameras among the cameras into a group, and record, among the received image data, image frames that are received from the predetermined cameras sorted into the group, in a single group file.

14 Claims, 15 Drawing Sheets

(56) References Cited

U.S. PATENT DOCUMENTS

| | | | |
|---|---|---|---|
| 2011/0293236 A1* | 12/2011 | Hsu | H04N 5/76 |
| | | | 386/223 |
| 2014/0132772 A1* | 5/2014 | Billau | G08B 13/19682 |
| | | | 348/159 |
| 2014/0211027 A1* | 7/2014 | Worrill | H04N 5/23206 |
| | | | 348/207.11 |
| 2016/0094773 A1* | 3/2016 | Maciuca | H04N 5/23206 |
| | | | 348/207.11 |
| 2016/0232764 A1* | 8/2016 | Galvin | G08B 13/1968 |

* cited by examiner

ND method for managing data

CROSS-REFERENCE TO RELATED APPLICATION

This application claims priority from Korean Patent Application No. 10-2016-0164905, filed on Dec. 6, 2016, in the Korean Intellectual Property Office, the disclosure of which is incorporated herein by reference in its entirety.

BACKGROUND

1. Field

Apparatuses and methods consistent with example embodiments relate to a data management device and a method for managing data, and more particularly, to a data management device for sorting a plurality of selected cameras into a group and managing images captured by the cameras belonging to the group as a single file, and a method for managing data.

2. Description of the Related Art

A network camera includes a processor for processing images and a network card therein, as well as a camera, allowing a user to send captured images to a remote user over the Internet.

The images captured by the network camera may be stored in a network image recorder (NVR) or may be monitored in real-time. The NVR may receive images from a plurality of network cameras and may store the images for each of the network cameras.

The images received from the network cameras are managed as separate files, and the monitoring device may display the images selected by the user.

Because the images captured by the network camera are managed as separate files, generation for the monitoring screen may impose a load burden. When there are a number of images for monitoring, a number of files may be accessed, data may be extracted therefrom, and accordingly a lot of resources are consumed for data reading.

Therefore, resources consumed for data reading may be reduced in outputting images received through a plurality of network cameras.

SUMMARY

Example embodiments provide a data management device that sorts a plurality of selected cameras into a group and manages images captured by the cameras belonging to the group as a single file.

It may be noted that objects of the present disclosure are not limited to the above-described objects, and other objects of the present disclosure will be apparent to those skilled in the art from the following descriptions.

According to an aspect of an example embodiment, there is provided a data management device including a communication interface configured to receive image data from cameras, and a data manager configured to sort predetermined cameras among the cameras into a group, and record, among the received image data, image frames that are received from the predetermined cameras sorted into the group, in a single group file.

According to an aspect of another example embodiment, there is provided a method including receiving image data from cameras, sorting predetermined cameras among the cameras into a group, and recording, among the received image data, image frames that are received from the predetermined cameras sorted into the group, in a single group file.

The example embodiments of the present disclosure will be described in the detail description with reference to the accompanying drawings.

BRIEF DESCRIPTION OF THE DRAWINGS

The above and other aspects and features of the present disclosure will become more apparent by describing in detail example embodiments thereof with reference to the attached drawings, in which.

DETAILED DESCRIPTION OF THE EXAMPLE EMBODIMENTS

Figure 1:
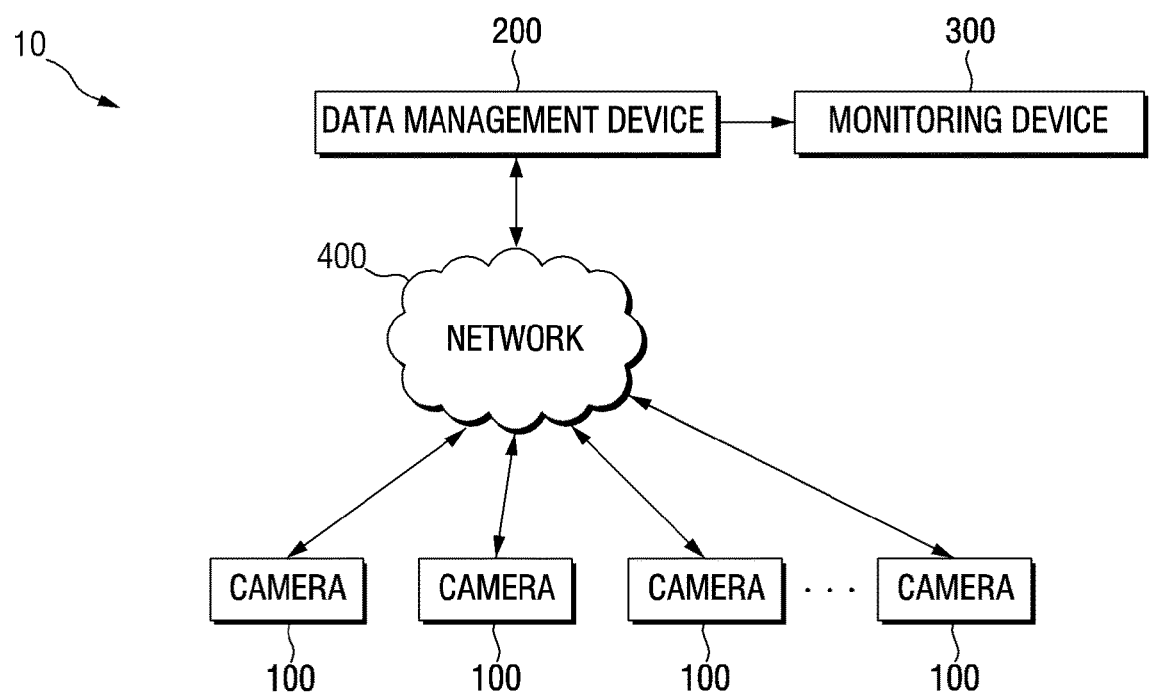
FIG. 1 is a view showing a data management system according to an example embodiment of the present disclosure.

Hereinafter, example embodiments of the present disclosure will be described in detail with reference to the accompanying drawings. Advantages and features of the present disclosure and methods to achieve them will become apparent from the descriptions of example embodiments herein below with reference to the accompanying drawings. However, the present disclosure is not limited to example embodiments disclosed herein but may be implemented in various different ways. The example embodiments are provided for making the disclosure of the present disclosure thorough and for fully conveying the scope of the present disclosure to those skilled in the art. It is to be noted that the scope of the present disclosure is defined solely by the claims Like reference numerals denote like elements throughout the descriptions.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, may be interpreted as having a meaning that is consistent with their meaning in the context of the relevant art and/or the present application, and will not be interpreted in an idealized or overly formal sense unless expressly so defined herein.

FIG. 1 is a view showing a data management system according to an example embodiment of the present disclosure.

Referring to FIG. 1, a data management system 10 includes cameras 100, a data management device 200, a monitoring device 300, and a network 400.

Each of the cameras 100 may generate and transmit image data. To this end, each of the cameras 100 may include a capturing device for receiving light reflected by a subject to convert it into an electric signal by using a charge coupled device (CCD) or a complementary metal-oxide semiconductor (CMOS), and an image processor for removing noise from a captured image, for extracting only components to be used, or for encoding an original image to generate a compressed image having a reduced data size.

In addition, each of the cameras 100 may include a communication interface for transmitting the image data processed by the image processor and receiving a control signal or the like. The communication interface may be, for example, a network interface card (NIC). That is, the cameras 100 according to the example embodiment of the present disclosure may include a network camera assigned its own IP address.

The data management device 200 may be able to store data received over the network 400, such as a network image recorder (NVR). To this end, the data management device 200 may include a storage and a communication interface. The communication interface disposed in the data management device 200 may also be a network interface card, like the camera 100. Accordingly, the data management device 200 may also be a device assigned its own IP address.

In addition, the data management device 200 according to the example embodiment of the present disclosure may include an output interface for outputting the received images.

The monitoring device 300 serves to display an image output from the data management device 200.

As described above, the data management device 200 may receive image data from the cameras 100 and may store or output it. When the data management device 200 reprocesses the image data to output it in the form of a playback image, the monitoring device 300 may display it.

The data management device 200 may sort one or more of the cameras 100 connected to the network 400 into a group and may manage the image data received from the group as a single file (hereinafter, referred to as a group file). It may be determined in advance which ones of the cameras 100 belong to the group.

Herein, the group may refer to a set of cameras 100 corresponding to images displayed on one screen by the monitoring device 300. That is, the monitoring device 300 may simultaneously or sequentially display the images captured by the cameras 100 belonging to one group on one screen. For example, when a group includes cameras a, b, and c, the monitoring device 300 may simultaneously display the images captured by the cameras a, b, and c, or may sequentially display the images captured by the cameras a, b and c.

If the image data items received from the cameras 100 are stored as different files, a plurality of files has to be accessed in displaying images captured by the cameras 100. This uses more resources for reading the stored data.

In contrast, the data management device 200 according to the example embodiment of the present disclosure may extract the group file from the group to be played back, may extract the images captured by the cameras 100 from the extracted group file, and may output the extracted image to the monitoring device 300. Because only one group file is used in displaying the images for one or more cameras 100, resources used for reading stored data can be reduced.

In addition, when a camera that is not participating in the network 400 newly joins the network 400, the image captured by the camera may be recorded in a group file. In this manner, the processing of the image captured by the camera newly participating in the network 400 may be performed, allowing the new camera to participate in the network 400 relatively freely.

The configuration and functionality of the data management device 200 will be described in detail later with reference to FIG. 2.

The network 400 may connect the cameras 100 to the data management device 200 and may relay data transmission/reception among the devices.

The communications scheme used in the network 400 is wired or wireless Internet. However, the communication scheme used in the network 400 is not limited thereto. For example, a communication scheme using a separate wired or wireless network such as a telephone network or a mobile communication network may be used in the network 400. Further, the network 400 may perform by employing multiple communication schemes in combination.

Figure 2:
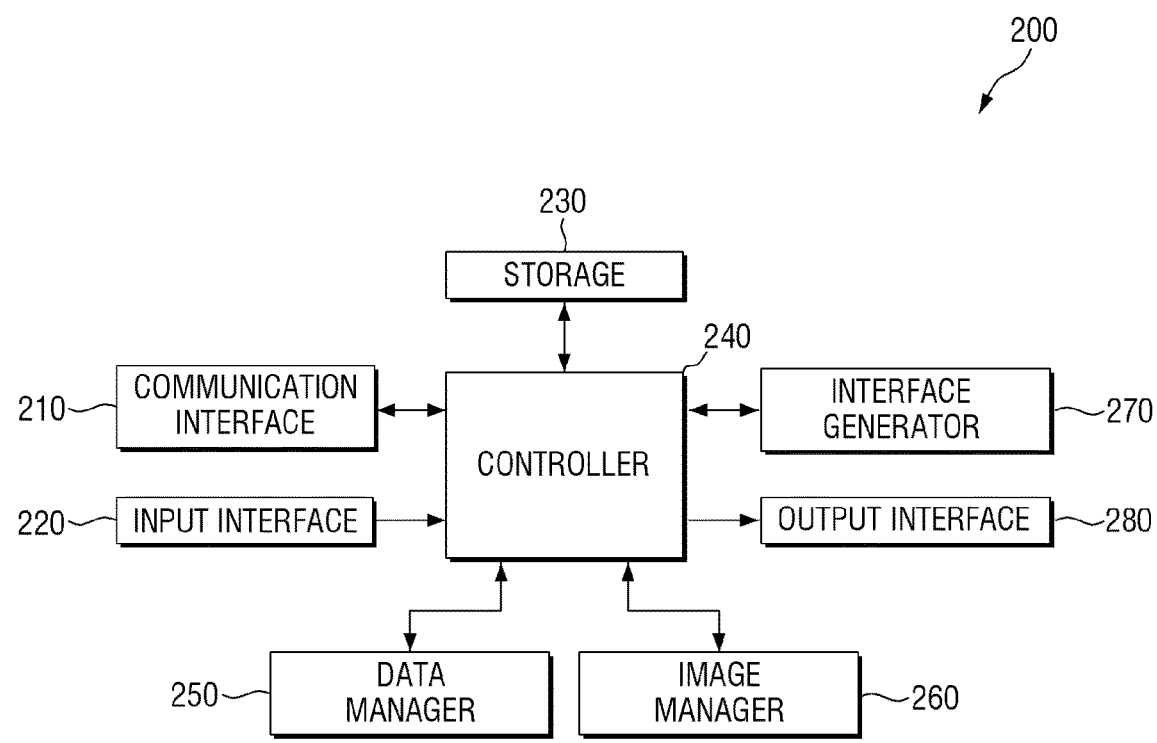
FIG. 2 is a block diagram showing a data management device according to an example embodiment of the present disclosure.
Figure 3:
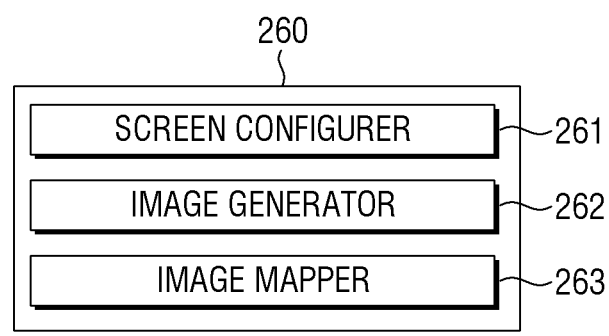
FIG. 3 is a block diagram showing in detail a configuration of an image management unit according to an example embodiment of the present disclosure.
Figure 4:
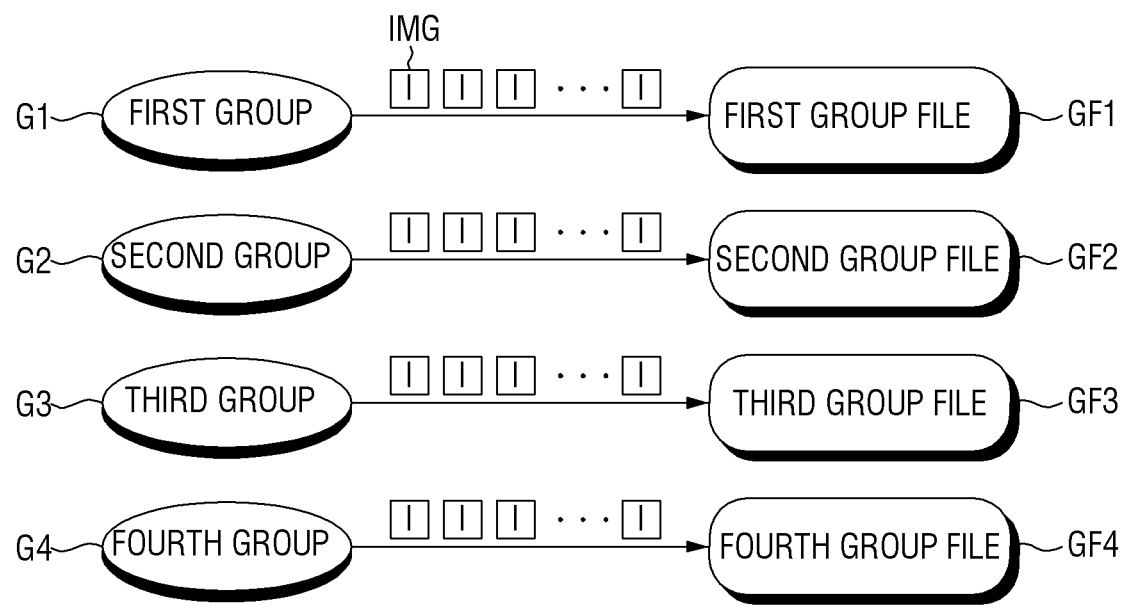
FIG. 4 is a view showing a relationship between groups and group files, according to an example embodiment of the present disclosure.

FIG. 2 is a block diagram showing a data management device according to an example embodiment of the present disclosure. FIG. 3 is a block diagram showing in detail a configuration of an image management unit according to an example embodiment of the present disclosure. FIG. 4 is a view showing a relationship between groups and group files, according to an example embodiment of the present disclosure.

Referring to FIG. 2, the data management device 200 includes a communication interface 210, an input interface 220, a storage 230, a controller 240, a data manager 250, an image manager 260, an interface generator 270, and an output interface 280.

The communication interface 210 may participate in the network 400 in a wired or wireless communications scheme to receive image data from a plurality of cameras 100. The communications schemes used by the communication interface 210 may include the Ethernet, the public switched telephone network (PSTN), a mobile communication network, a wireless LAN, Bluetooth, Wi-Fi (Wireless Fidelity), universal mobile telecommunications system (UMTS), high speed downlink packet access (HSDPA), wireless broadband (WiBro), etc.

In addition, the communication interface 210 may transmit a control command to the plurality of cameras 100 connected to the network 400. The control command may be generated by the controller 240.

The input interface 220 may receive a user command. To this end, the input interface 220 may include a button, a wheel, a jog shuttle, etc. The user command received by the input interface 220 may include a camera control command and an image control command.

The camera control command includes a command to control the operation of the cameras 100. For example, a user may operate the cameras 100 to transmit image data or may interrupt the operation of the cameras 100 by using the camera control command. In addition, when the cameras 100 include pan tilt feature, the user may control the pan tilt of the cameras 100 by using the camera control command.

The image control command includes a control command on the image data received from the camera 100s. For example, a user may sort one or more of the cameras 100 into a group by using the image control command. As the group is created, images corresponding to the group may be displayed on the monitoring device 300.

The storage 230 stores the image data received from the cameras 100. The image data is stored as a file as described above, and the image data received from any one or any combination of the cameras 100 belonging to a group may be recorded in a single group file and stored in the storage 230. Accordingly, the image data for each of a plurality of groups may be recorded in the respective group files and stored in the storage 230.

Referring to FIGS. 2 and 4, the data manager 250 manages the image data items received from the cameras 100. The data manager 250 may sort one or more predetermined cameras 100 among the plurality of cameras 100 connected to the network 400 into a group, and may record the images received from the cameras 100 belonging to the group in a single group file.

FIG. 4 shows that a plurality of group files GF1, GF2, GF3 and GF4 are generated by using image data items IMG received from a plurality of groups G1, G2, G3 and G4, respectively. One or more cameras 100 may belong to each of the groups G1, G2, G3 and G4, and the image data items IMG received from the one or more cameras 100 belonging to each of the groups may be included in a single group file.

The data manager 250 may use IP (Internet Protocol) information of the cameras 100 to generate the group files GF1, GF2, GF3 and GF4. The IP information of the cameras 100 belonging to a group may be matched to the group, such that it may be stored in the storage 230 in the form of a list (hereinafter referred to as a group list). The data manager 250 may compare the IP information of each of the cameras 100 specified in the header of the image data item IMG with the IP information specified in the group list, to thereby determine the group to which each image data item IMG belongs.

The data manager 250 may insert the identification information assigned to each of the cameras 100 belonging to the groups G1, G2, G3 and G4 in the respective image data item IMG to record it in the group files GF1, GF2, GF3 and GF4. Each image data IMG includes at least one image frame, and the data manager 250 may include the identification information in the header of the image frame. Accordingly, the headers of the image frames included in one image data IMG may include the same identification information.

According to an example embodiment of the present disclosure, each of the group files GF1, GF2, GF3 and GF4 may include the image data IMG on image frame basis. The data manager 250 records the image frames each including the identification information in the group files GF1, GF2, GF3 and GF4 in the chronological order that they are received. Different image frames captured by different cameras 100 may be included in the group files GF1, GF2, GF3 and GF4 in the order that they are received. Accordingly, it is possible to extract data from the group files GF1, GF2, GF3, and GF4 image frame-by-image frame.

The identification information specified in the image frame may be used for image playback. In displaying images for a group, the image manager 260 may extract image frames from the group file corresponding to the group in the order that they are recorded. Then, the image manager 260 may refer to the identification information specified in the extracted image frame to check from which one of the cameras 100 the image frame has been received, and may map it to an appropriate area of the screen. Hereinafter, the image manager 260 will be described in detail with reference to FIG. 3.

Referring to FIG. 3, the image manager 260 includes a screen configurer 261, an image generator 262, and an image mapper 263.

The screen configurer 261 may configure a group image screen 20 so that it includes playback areas each for respective cameras belonging to a group. Because images captured by cameras 100 belonging to a group can be displayed on a screen, the screen configurer 261 configures the group image screen so that images associated with the group is played back thereon.

For example, when a group includes four cameras 100, the screen configurer 261 may configure the group image screen so that it includes four playback areas. When a group includes six cameras 100, the screen configurer 261 may configure the group image screen so that it includes six playback areas.

The image generating unit 262 extracts image frames included in the group files according to the identification information, and generates playback images. As described above, the group files store data on image frame basis. Accordingly, the image generator 262 may extract the image frames in the order that they are recorded in the group files.

The image frames captured by the plurality of cameras 100 are recorded in the group file not for each of the cameras 100 but in the order that they have been received by the data management device 200. That is, when the image generator 262 extracts a series of image frames from a group file, the series of image frames may be image frames from the plurality of cameras 100. Therefore, to generate playback images by one of the cameras 100, a process of grouping the image frames only from the camera may be carried out.

The image generator 262 may check the identification information in the headers of the image frames extracted from the group files and may configure a single playback image with the image frames having the same identification information. The identification information is assigned for each of the cameras 100. By combining the image frames having the same identification information, the playback image of the corresponding camera 100 can be configured.

The image mapper 263 maps the playback image to the corresponding one of the playback areas on the group image screen. Once the screen configurer 261 configures the group image screen including the playback areas and the image generator 262 generates the playback images each from the respective cameras 100, the image mapper 263 maps each of the playback images to the respective playback areas.

When a group includes four cameras 100, the screen configurer 261 configures the group image screen including four playback areas, the image generator 262 configures playback images each for the respective four cameras 100, and the image mapper 263 maps the four playback images to the four playback areas, respectively. As a result, images from the four cameras 100 can be played back on one group image screen.

The interface generator 270 serves to create a command input interface. The command input interface is a visual interface for receiving commands such as group selection or camera selection. The utilization of the command input interface will be described later with reference to FIGS. 8 to 12.

The output interface 280 outputs the group image screen generated by the image manager 260. The output group image screen may be transmitted to the monitoring device 300. The monitoring device 300 may display the received group image screen.

The controller 240 performs the overall control of the communication interface 210, the input interface 220, the storage 230, the data manager 250, the image manager 260, the interface generator 270, and the output interface 280. In addition, the controller 240 may generate a control command. The control command may include a camera control command and an image control command. The camera control command and the image control command have already described above; and, therefore, redundant description will be omitted.

Figure 5:
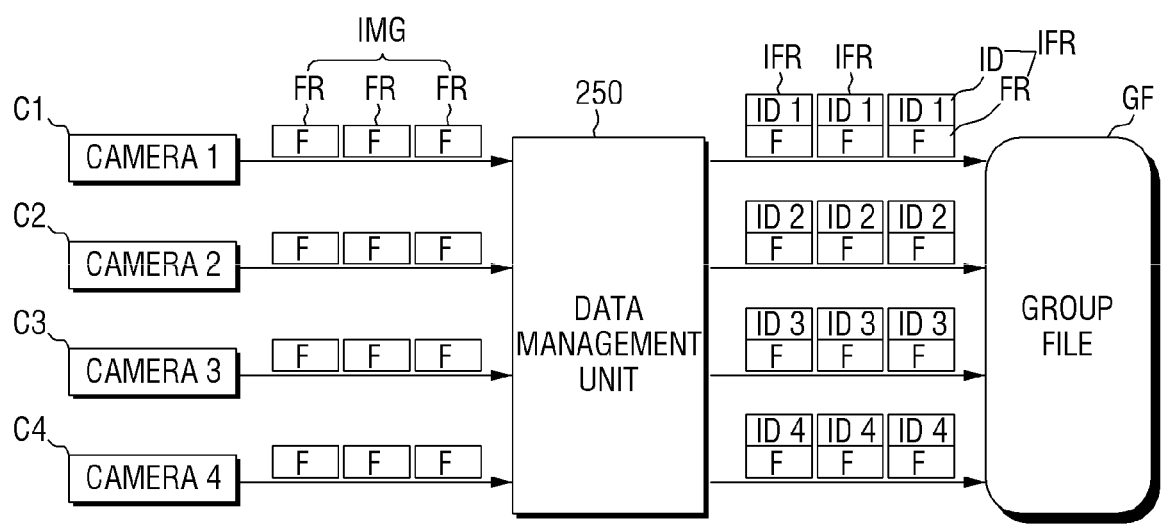
FIG. 5 is a view showing generation of a group file, according to an example embodiment of the present disclosure.

FIG. 5 is a view showing generation of a group file, according to an example embodiment of the present disclosure.

Referring to FIG. 5, image data items IMG received from a plurality of cameras C1, C2, C3 and C4 may be recorded in a single group file GF.

The cameras C1, C2, C3 and C4 may transmit image data items IMG. Each of the image data items IMG may include a plurality of image frames FR. The data manager 250 may insert identification information ID in the header of each image frame FR.

The identification information ID is unique information assigned for each of the cameras C1, C2, C3 and C4. For example, the identification information ID may be generated by using the IP addresses of the cameras C1, C2, C3 and C4.

The data manager 250 may generate one group file GF for one group and record the image frame IFR including the identification information ID in the group file GF. The data manager 250 receives the image frames FR from the plurality of cameras C1, C2, C3 and C4, and may insert identification information ID into each of the image frames FR in the order that they are received, such that image frames IFR including the identification information ID may be sequentially recorded in the group file GF.

Figure 6:
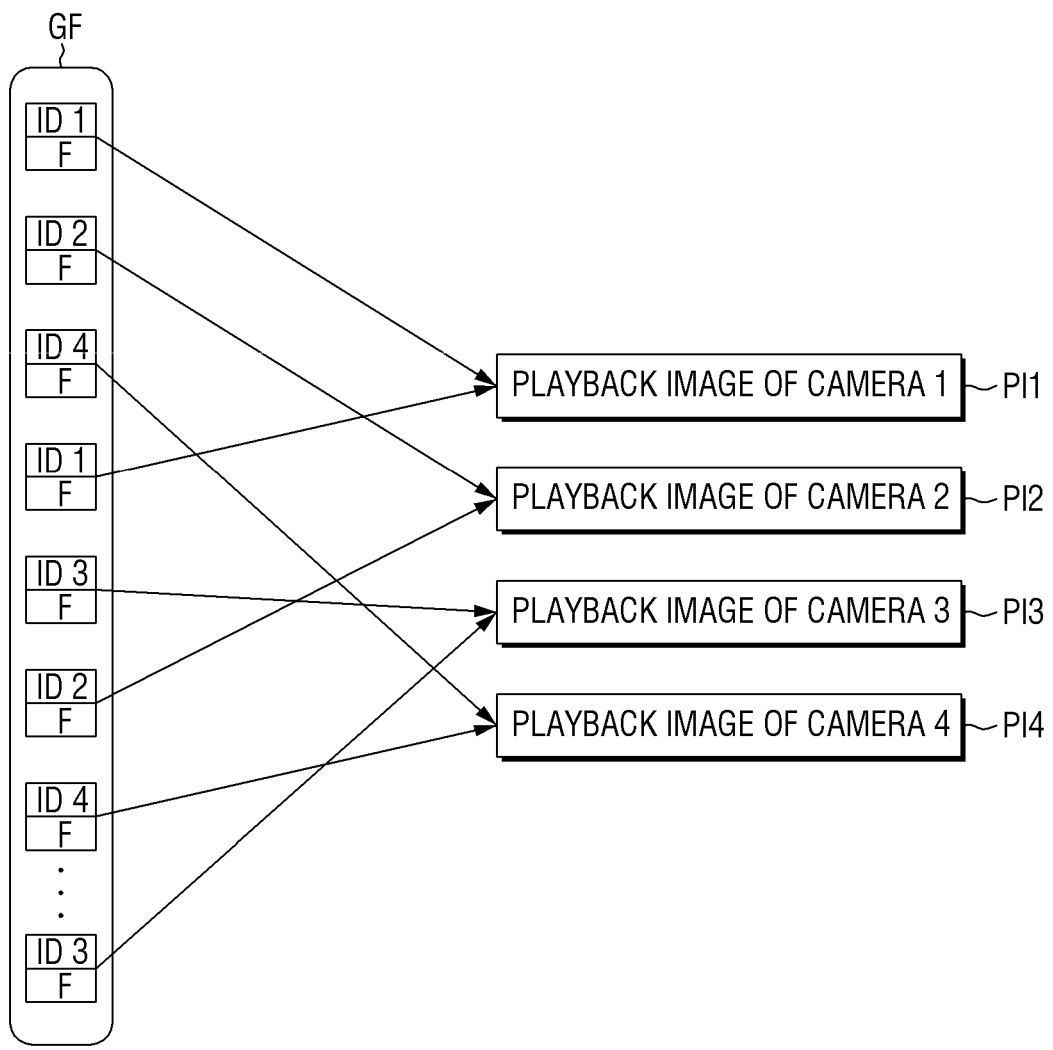
FIG. 6 is a view showing playback images according to an example embodiment of the present disclosure.

FIG. 6 is a view showing playback images according to an example embodiment of the present disclosure.

Referring to FIG. 6, playback images PI1, PI2, PI3 and PI4 may be generated by combining the image frames included in the group file GF.

The group file GF may randomly include image frames from a plurality of cameras. As described above, the data manager 250 inserts the identification information into the image frames in the order that they have been received and records them in the group file GF. Accordingly, the order that the image frames included in the group file GF are recorded is determined at random.

To generate the playback images PI1, PI2, PI3 and PI4, the image generating unit 262 may sequentially extract the image frames included in the group file GF. Then, the image generating unit 262 may check the identification information included in the extracted image frame to determine from which one of the cameras the image frame has been received. Then, the image generator 262 may generate the playback images PI1, PI2, PI3 and PI4 by combining the image frames received from the same camera.

FIG. 6 shows that the group file GF includes image frames for four cameras, and the image frames are combined to generate four playback images PI1, PI2, PI3 and PI4.

Although FIG. 6 shows that the playback images PI1, PI2, PI3 and PI4 for all of the cameras belonging to the group file GF are generated, the image generator 262 may generate playback images only from one of the cameras according to the user's choice. In this case, the screen configurer 261 and the image mapper 263 may also perform screen configuration and image mapping so that images only from the camera selected by the user are displayed. For example, when a group file includes image frames from four cameras, a user may enter a user command so that images from two of the cameras are displayed. In this case, the screen configurer 261, the image generator 262, and the image mapper 263 may respectively perform screen configuration, image generation and image mapping so that two playback images are displayed.

In the following description, it is assumed that images from all of the cameras belonging to the group are displayed.

Figure 7:
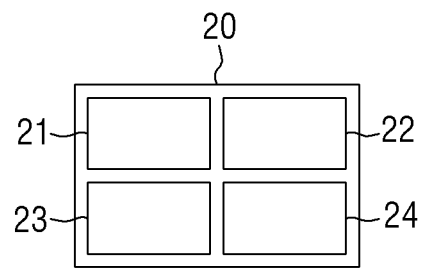
FIG. 7 is a view showing a group image screen according to an example embodiment of the present disclosure.

FIG. 7 is a view showing a group image screen according to an example embodiment of the present disclosure.

Referring to FIG. 7, a group image screen 20 may include one or more playback areas 21, 22, 23 and 24.

The screen configurer 261 may configure the group image screen 20 so that it includes the playback images each for the respective cameras belonging to a group. The playback images may be displayed in the playback areas 21, 22, 23 and 24 on the group image screen 20. FIG. 7 shows that four playback areas 21, 22, 23 and 24 are provided on the group image screen 20. Accordingly, the group image screen 20 of FIG. 7 may display images received from the four cameras.

If the group includes five cameras, the screen configurer 261 may configure the group image screen so that it includes five playback areas.

The sizes of the playback areas on the group image screen 20 may be determined in advance. For example, the playback areas on the group image screen 20 may all have the same size, some of them may have different sizes, or all of them may have different sizes.

In addition, the layout of the playback areas on the screen may be determined in advance. For example, the playback areas may be arranged such that their corners are in parallel with one another, and adjacent playback areas may at least partially overlap with one another.

The size and layout of the playback areas may vary depending on the number of the playback areas or may be determined by the user. For example, the user may determine the size and layout of the playback areas for a camera.

Figure 8:
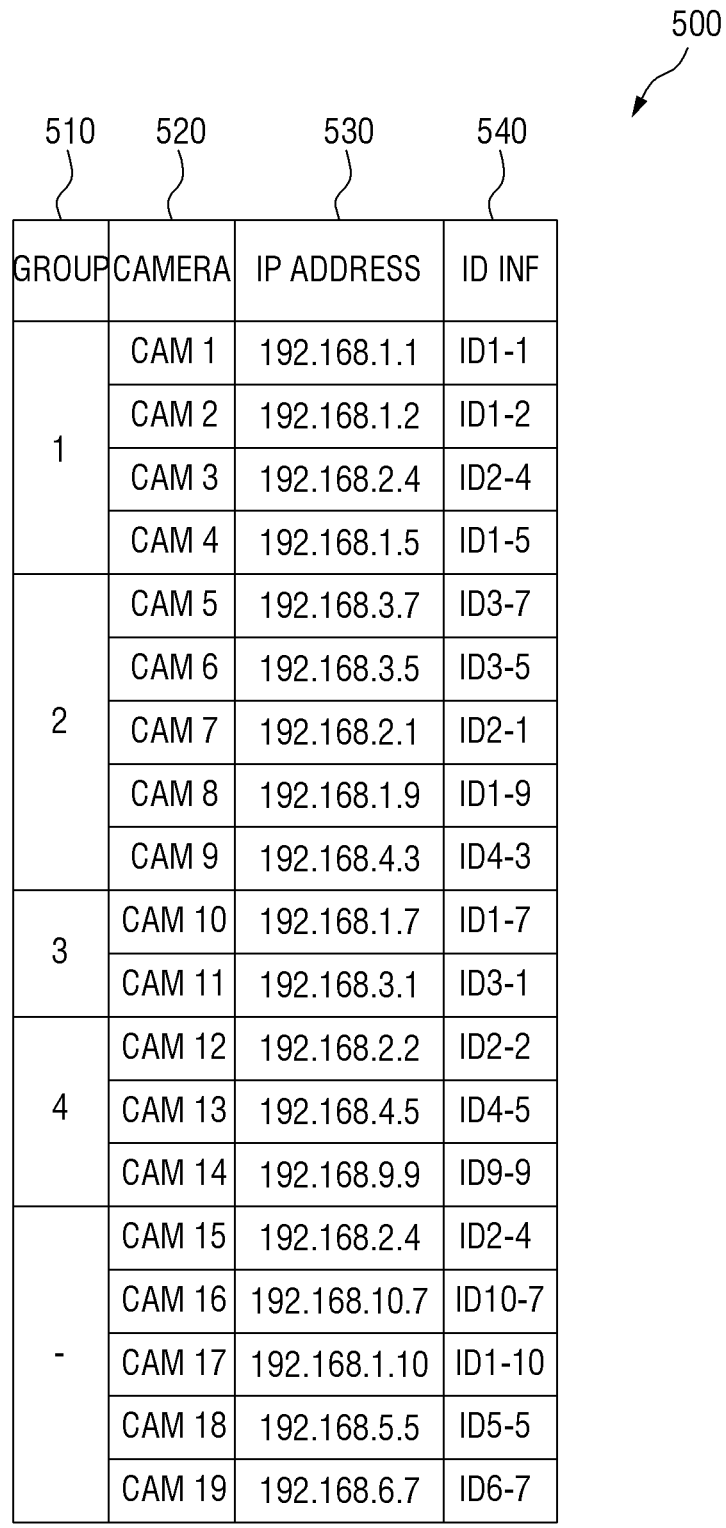
FIG. 8 is a view showing a command input interface according to an example embodiment of the present disclosure.

FIG. 8 is a view showing a command input interface according to an example embodiment of the present disclosure.

Referring to FIG. 8, a command input interface 500 includes a group field 510, a camera field 520, an IP address field 530, and an identification information field 540.

The command input interface 500 according to the example embodiment of the present disclosure may be used to receive a user command. The command input interface 500 may be displayed on the screen of the monitoring device 300. The user may perform group resetting of the cameras while checking the status of the cameras for each of the groups.

In the group field 510, unique information identifying each group may be specified. In FIG. 8, the unique information identifying each group is expressed as numbers. However, the unique information may be expressed as characters, or combinations of numbers and characters. In the list, some cameras with no unique information specified in the group field 510 do not belong to any group.

In the camera field 520, information identifying each of the cameras may be specified. The names of the cameras given by the user may be specified in the camera field 520. For example, "101 Doorway," "playground," "entrance" and so on may be specified in the camera field 520.

In the IP address field 530, IP addresses assigned to the cameras may be specified. The user may identify the IP address of each of the cameras by using the IP addresses specified in the IP address field 530.

In the identification information field 540, the identification information assigned to each of the cameras may be specified. The identification information may be generated by using the IP address as unique information assigned to each of the cameras or may be created by a user.

The information included in the command input interface 500 may be used for generating group files and playback images, rather than for entering user commands. The information included in the command input interface 500 may be stored in the storage 230 in the form of a table (hereinafter referred to as a group information table), such that the data manager 250 and the image manager 260 may use the group information table to generate group files or playback images.

For example, when image data is received, the data manager 250 may check the IP address of the camera from the image data and identify the group corresponding to the checked IP address from the group information table. Then, the data manager 250 may record image frames in the group file corresponding to the identified group.

In addition, in generating playback images, the image manager 260 may extract the identification information from the image frame, and identify the camera corresponding to the extracted identification information from the group information table. Then, the image manager 260 may map the playback image to the playback area corresponding to the identified camera.

Hereinafter, the use of the command input interface 500 will be described in detail with reference to FIGS. 9 to 12.

Figure 9:
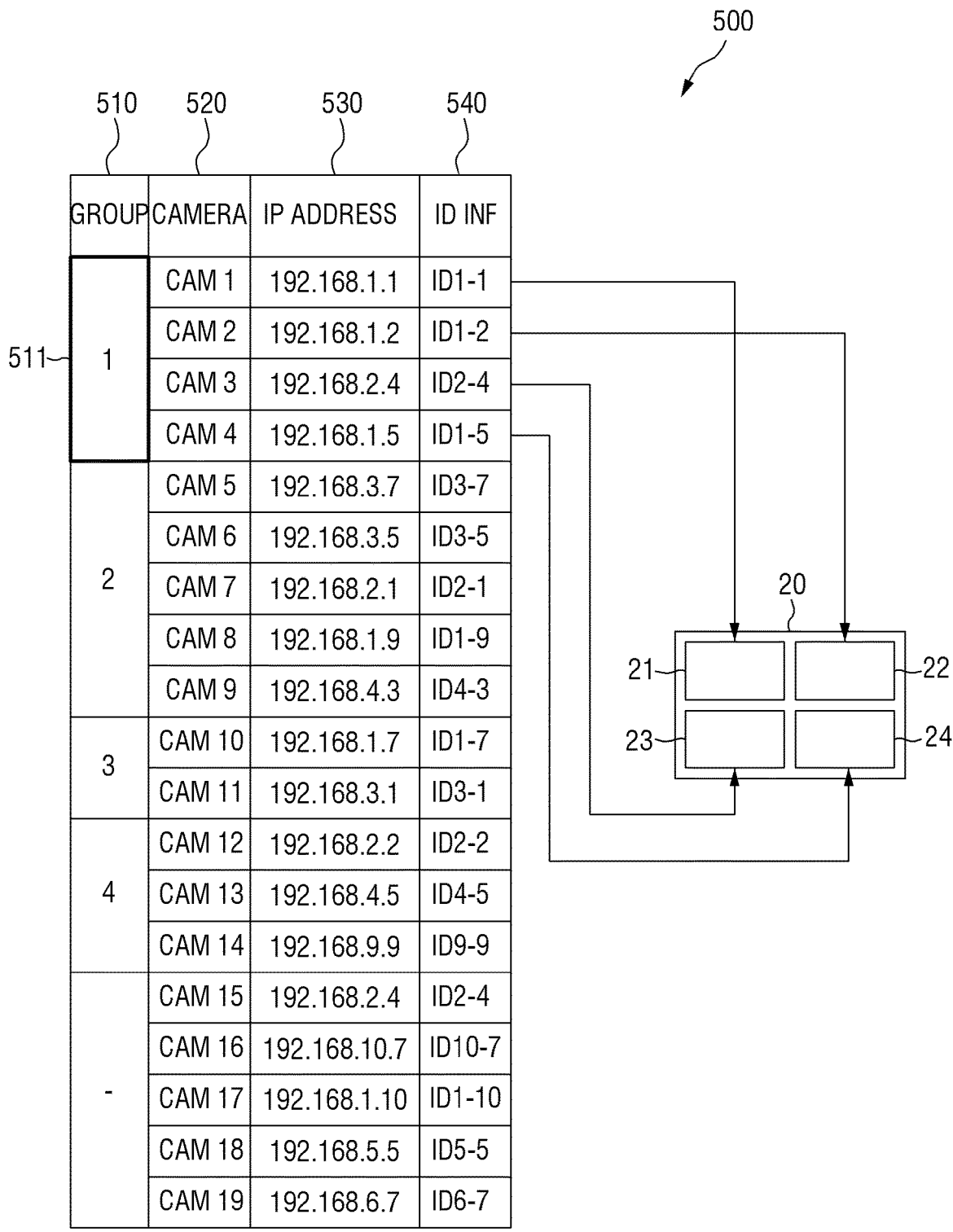
FIG. 9 is a view showing that a group is selected by using a command input interface, according to an example embodiment of the present disclosure.

FIG. 9 is a view showing that a group is selected by using a command input interface, according to an example embodiment of the present disclosure.

Referring to FIG. 9, a user may select a group for playback by using the group field 510. In FIG. 9, "Group 1" has been selected. The user may select Group 1 by selecting an area 511 corresponding to Group 1 with a pointer or the like.

Upon selecting Group 1, the image manager 260 may configure the group image screen 20 so that the images of the cameras belonging to Group 1 are displayed. The image manager 260 may extract image frames from the group file corresponding to Group 1, may generate playback images using the identification information of the extracted image frames, and may map the playback images to the playback areas 21, 22, 23 and 24 on the group image screen, respectively.

FIG. 9 shows that four playback areas 21, 22, 23 and 24 are provided on the group image screen 20 because Group 1 includes four cameras. The image manager 260 may configure the group image screen so that the number of playback areas is equal to the number of the cameras belonging to the group selected by the user.

Figure 10:
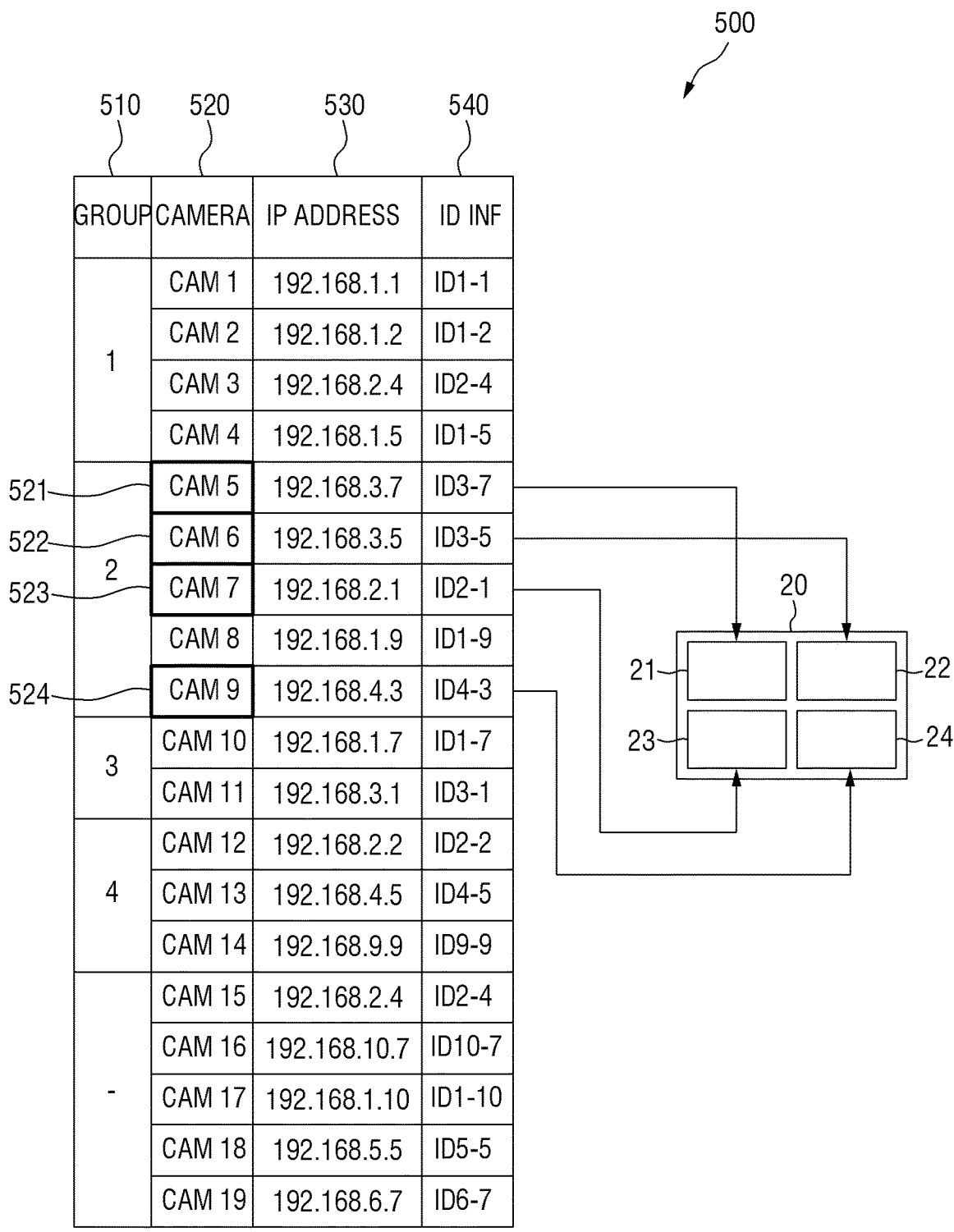
FIGS. 10 and 11 are views showing that cameras are selected by using a command input interface, according to an example embodiment of the present disclosure.
Figure 11:
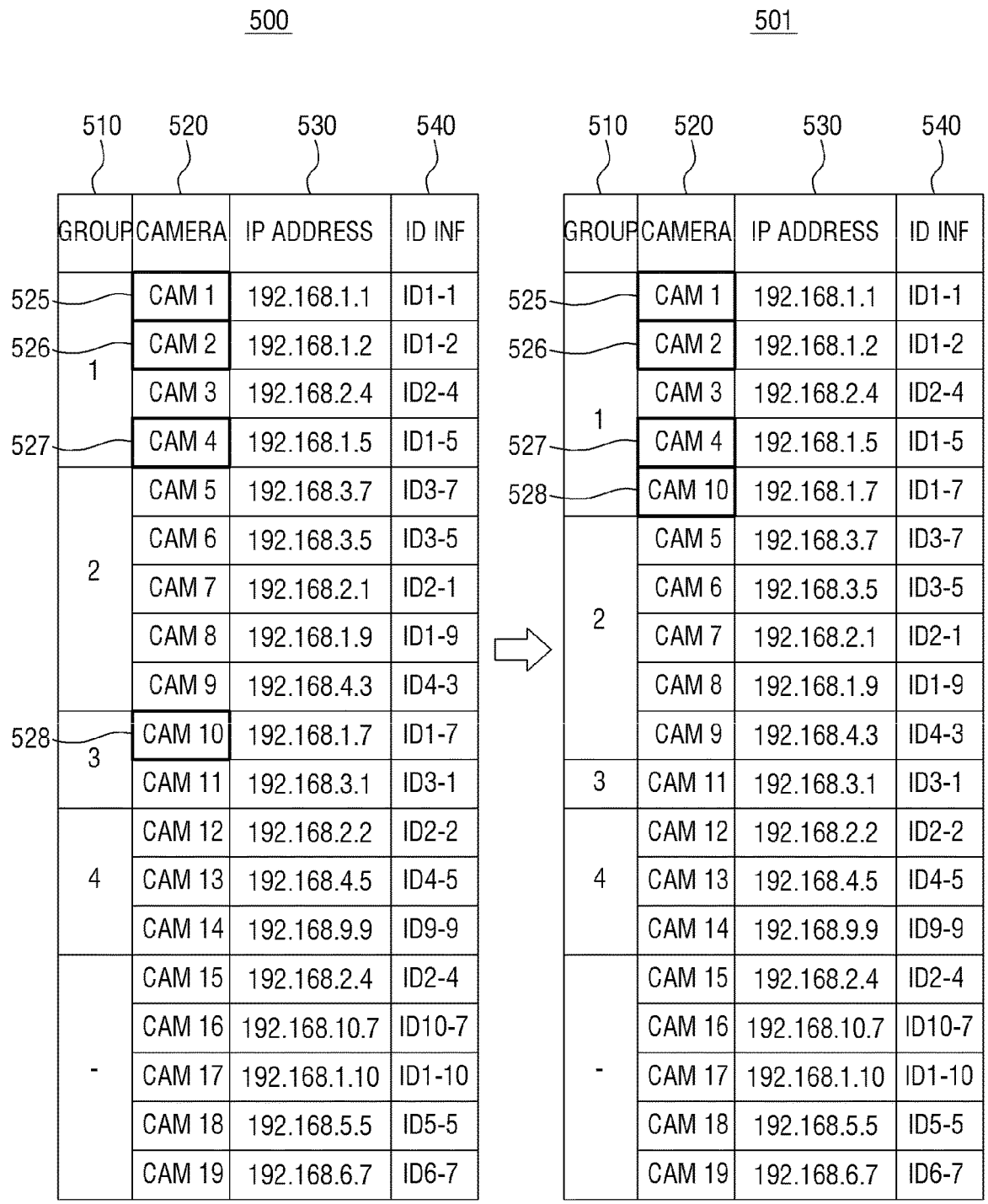

FIGS. 10 and 11 are views showing that cameras are selected by using a command input interface, according to an example embodiment of the present disclosure.

Referring to FIG. 10, the user may select cameras for playback by using the camera field 520. In FIG. 10, four of the cameras belonging to Group 2 have been selected. The user may select the cameras by selecting areas 521, 522, 523 and 524 corresponding to the cameras, respectively, with a pointer or the like.

Upon selecting the cameras, the image manager 260 may configure the group image screen 20 so that the images of the cameras are displayed. The image manager 260 may extract image frames from the group file corresponding to Group 2, may generate playback images using the identification information of the extracted image frames, and may map the playback images to the playback areas 21, 22, 23 and 24 on the group image screen, respectively. In this example, the image manager 260 may generate the playback images using the image frames including identification information ID 3-7, ID 3-5, ID 2-1 and ID 4-3, but not the image frame including ID 1-9.

FIG. 10 shows that four playback areas 21, 22, 23 and 24 are provided on the group image screen 20 because the user has selected the four cameras.

Referring to FIG. 11, the user may select cameras for playback by using the camera field 520. In FIG. 11, three of the cameras belonging to Group 1 and one of the cameras belonging to Group 3 have been selected. The user may select the cameras by selecting the areas 525, 526, 527 and 528 corresponding to the cameras, respectively, with a pointer or the like.

As the cameras belonging to the different groups have been selected, the data manager 250 may reconfigure the groups and the group files before the configuration of the group image screen by the image manager 260, such that the image data received from the cameras belonging to different groups may be recorded in a single group file. That is, the data manager 250 may extract the image frame corresponding to the identification information ID 1-7 from the group file corresponding to Group 3, and may record the extracted image frame in the group file corresponding to Group 1. As a result, the group file corresponding to Group 1 includes the image frames in each of which identification information ID1-1, ID1-2, ID2-4, ID1-5 and ID1-7 are specified, respectively.

As the groups and the group files are reconfigured, the interface generator 270 may reconfigure a command input interface 501, and the image manager 260 may configure the group image screen so that the images of the selected cameras are displayed thereon. The image manager 260 may extract image frames from the group file corresponding to Group 1, may generate playback images using the identification information of the extracted image frames, and may map the playback images to the playback areas on the group image screen, respectively. In this example, the image manager 260 may generate the playback images using the image frames including the identification information ID 1-1, ID 1-2, ID 1-5 and ID 1-7, but not the image frame including the identification information ID 2-4.

In the foregoing description, the data manager 250 reconfigures the groups and the group files when the cameras belonging to different groups are selected. However, the image manager 260 may configure the group image screen without reconfiguring the groups and the group files. In this case, the image manager 260 may extract image frames from different group files belonging to different groups to generate playback images.

Figure 12:
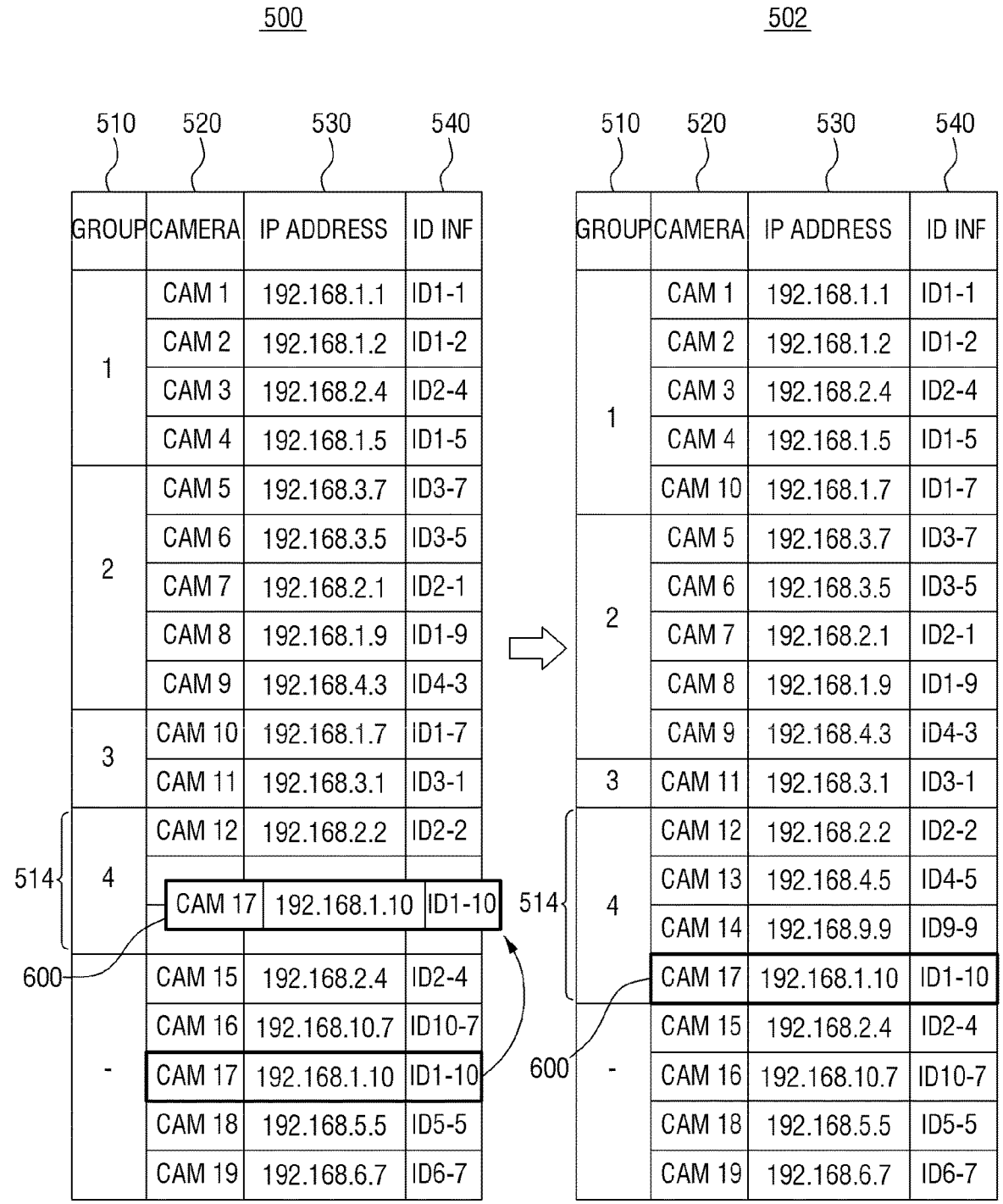
FIG. 12 is a view showing that a selected camera is added to a group, according to an example embodiment of the present disclosure.

FIG. 12 is a view showing that a selected camera is added to a group, according to an example embodiment of the present disclosure.

Referring to FIG. 12, the cameras selected by a user may belong to a group.

All of the cameras connected to the network 400 may transmit image data to the data management device 200. However, some of the cameras may belong to the group, but the others may not. That is, the cameras not belonging to any group (non-group cameras) may also continuously transmit image data to the data management device 200.

The user may add a camera belonging to another group or a non-group camera to a group. To this end, the input interface 220 may receive setting information for a camera (hereinafter, referred to as a newly participating camera) to be included in the group. That is, the input interface 220 may receive a command to add a newly participating camera among the plurality of cameras connected to the network 400, and the data manager 250 may reconfigure the group so that it includes the newly participating camera.

As the groups are reconfigured, the data manager 250 may record the image data received from the cameras belonging to the reconfigured group in a single group file.

Referring to FIG. 12, the user may move a non-group camera to a group through the command input interface 500. FIG. 12 shows that an item 600 corresponding to a camera 17 has moved to an area 514 of Group 4. This may be performed, for example, in a drag-and-drop manner. As a result, the camera 17 may belong to Group 4.

As the camera 17 belongs to Group 4, the interface generator 270 may reconfigure a command input interface 502. Then, the data manager 250 may record the image data received from the camera 17 in the group file corresponding to Group 4.

Although FIG. 12 shows that the group resetting is carried out through the command input interface 500, the group resetting is not limited thereto. For example, the user may add a non-group camera to a group in various ways through the input interface 220. In addition, a camera having an IP address or identification information may be added to a group by presetting.

Figure 13:
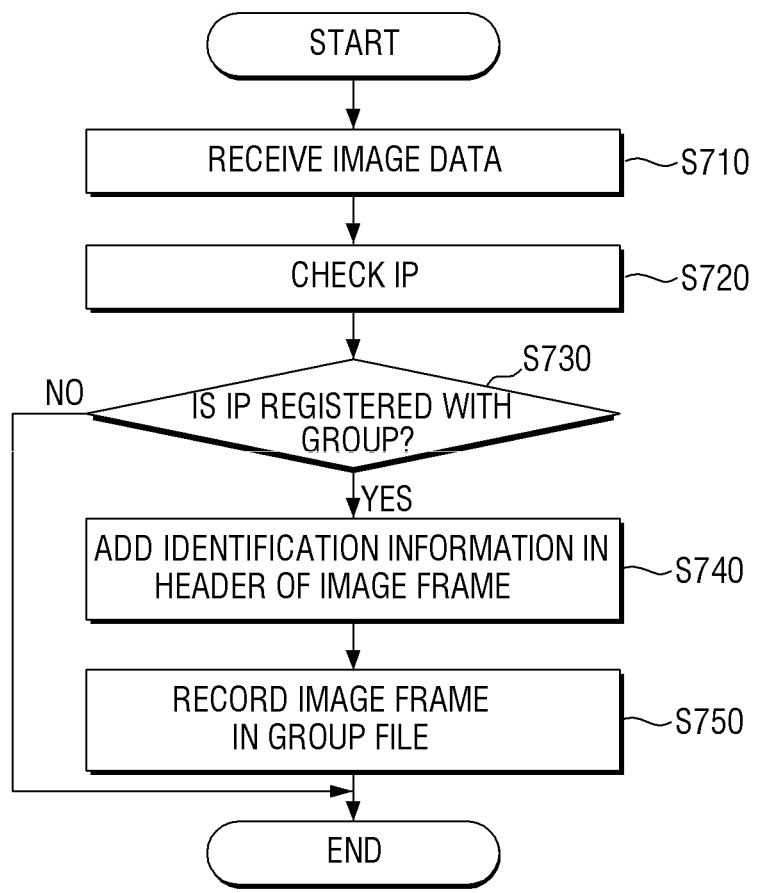
FIG. 13 is a flowchart for illustrating a method of generating group files, according to an example embodiment of the present disclosure.

FIG. 13 is a flowchart for illustrating a method of generating group files, according to an example embodiment of the present disclosure.

Referring to FIG. 13, the data manager 250 may create a group file using the received image data.

Initially, the communication interface 210 may receive image data from cameras connected to the network 400 (step S710). Upon receiving the image data, the data manager 250 may check the IP address of a camera that has transmitted the image data (step S720). The IP address of the camera may be included in the header of the image data.

Subsequently, the data manager 250 may determine whether the checked IP address is registered with any of the groups, using the group information table (step S730). If it is determined that the checked IP address is registered with a group, the data manager 250 may add the identification information to the header of the image frame included in the image data (step S740). The identification information may be either specified in the group information table or newly generated by the data manager 250.

Subsequently, the data manager 250 may record image frames including the identification information in the group file of the corresponding group (step S750).

On the other hand, if it is determined that the IP address checked by using the group information table is not registered with any group, the data manager 250 may not perform subsequent additional operations on the received image data.

Figure 14:
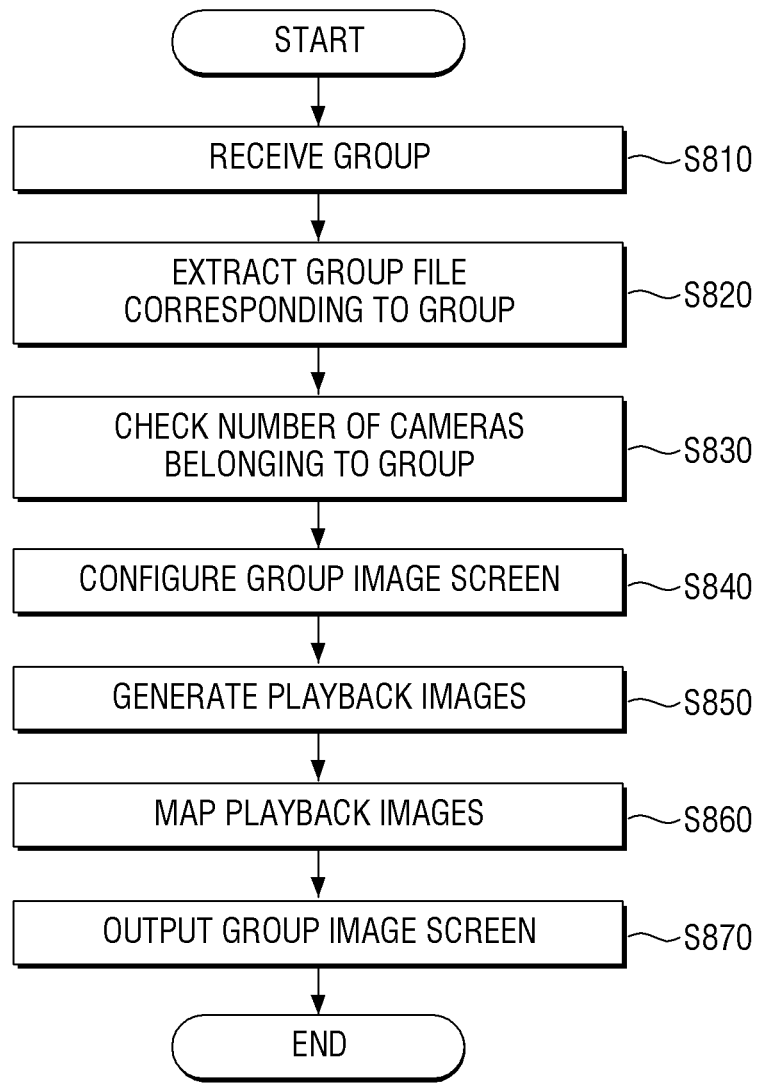
FIG. 14 is a flowchart illustrating a method of outputting a group image screen, according to an example embodiment of the present disclosure.

FIG. 14 is a flowchart illustrating a method of outputting a group image screen, according to an example embodiment of the present disclosure.

Referring to FIG. 14, a user may allow an image screen (group image screen) from cameras belonging to a group to be output.

Initially, the input interface 220 may receive a group for playback from the user (step S810). For example, the user may enter a group through the group field 510 included in the command input interface 500 described above.

Upon the group being entered, the controller 240 may extract the group file corresponding to the entered group from the storage 230 (step S820). Subsequently, the controller 240 may check the number of cameras belonging to the group (step S830). The controller 240 may scan the group file to determine the number of the cameras having captured images included in the group file. Alternatively, information indicative of the number of cameras may be described in the header or a portion of the group file. The controller 240 may use the described information to determine the number of the cameras having images included in the group file.

The number of cameras belonging to the group is transmitted to the screen configurer 261. The screen configurer 261 may configure the group image screen so that it includes the playback areas each for the respective cameras (step S840). The image generator 262 may extract image frames from the group file according to the identification information to generate playback images (step S850). The image mapper 263 may map the playback images to the playback areas on the group image screen, respectively (step S860).

The group image screen to which the playback images are mapped may be output by the output interface 280 and transmitted to the monitoring device 300. The monitoring device 300 may output the transmitted group image screen (step S870).

Figure 15:
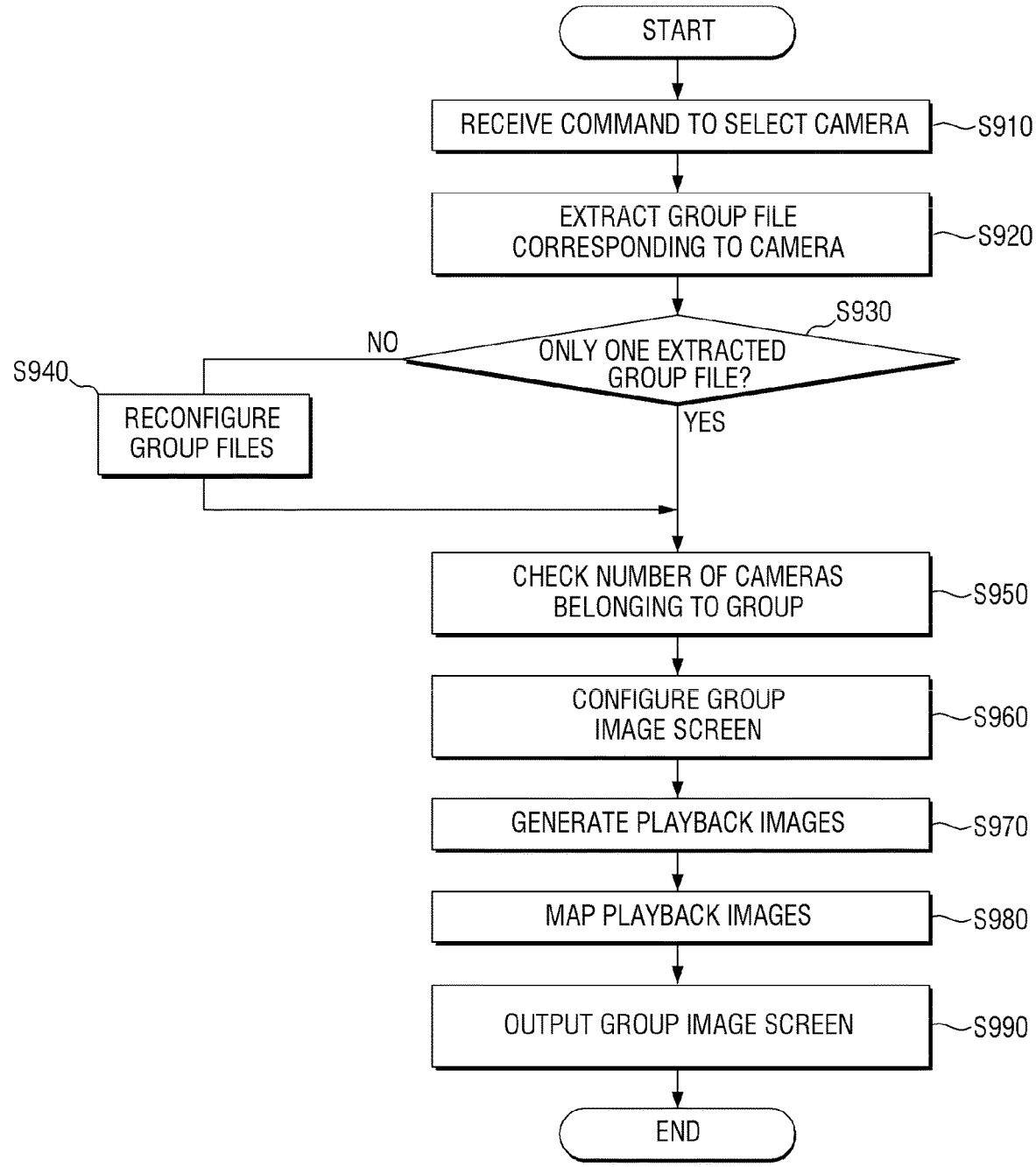
FIG. 15 is a flowchart illustrating a method of outputting a group image, according to another example embodiment of the present disclosure.

FIG. 15 is a flowchart illustrating a method of outputting a group image, according to another example embodiment of the present disclosure.

Referring to FIG. 15, a user may allow an image screen (group image screen) from a camera to be output.

Initially, the input interface 220 may receive a command to select a camera for playback from the user (step S910). For example, the user may enter the command through the camera field 520 included in the command input interface 500 described above.

Upon the command being entered, the controller 240 may extract the group file corresponding to the selected camera from the storage 230 (step S920). Subsequently, the controller 240 may determine whether only one group file has been extracted (step S930). If it is determined that only one group file has been extracted, the controller 240 may check the number of cameras belonging to the group (step S950). The controller 240 may scan the group file to determine the number of the cameras having captured images included in the group file. Alternatively, information indicative of the number of cameras may be described in the header or a portion of the group file. The controller 240 may use the described information to determine the number of the cameras having images included in the group file.

On the other hand, if it is determined that more than one group files have been extracted, the controller 240 may allow the data manager 250 to reconfigure the group files. Accordingly, the data manager 250 may reconfigure the group files so that the image frames from the selected plurality of cameras are included in a single group file (step S940). The algorithm for reconfiguring the group files may be determined in various ways. For example, if the number of cameras belonging to a first group is larger than the number of cameras belonging to a second group, the image data included in the group file of the second group may be moved to the group file of the first group, such that the group files may be reconfigured. Only the image data of the camera selected by the user among the image data included in the group file of the second group may be moved to the group file of the first group.

Reconfiguring the group files may refer to reconfiguring the groups. As the groups are reconfigured, the controller 240 may determine the number of the cameras belonging to the reconfigured group (step S950).

The number of cameras belonging to the group is transmitted to the screen configurer 261. The screen configurer 261 may configure the group image screen so that it includes the playback areas each for the respective cameras (step S960). The image generator 262 may extract image frames from the group file according to the identification information to generate playback images (step S970). The image mapper 263 may map the playback images to the playback areas on the group image screen, respectively (step S980).

The group image screen to which the playback images are mapped may be output by the output interface 280 and transmitted to the monitoring device 300. The monitoring device 300 may output the transmitted group image screen (step S990).

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

Although the example embodiments of the present disclosure have been described with reference to the accompanying drawings, those skilled in the art will appreciate that various modifications and alterations may be made without departing from the spirit of the present disclosure. Therefore, it may be understood that the above-mentioned example embodiments are not limiting but illustrative in all aspects.

What is claimed is:

1. A data management device comprising:
    a communication interface configured to receive image data from cameras; and
    at least one processor configured to implement a data manager configured to:
    sort predetermined cameras among the cameras into a group based on an input from a user
    insert identification information of the predetermined cameras, into headers of image frames included in the image data received from the predetermined cameras; and
    record the image frames into which the identification information is inserted, in a single group file,
    an image manager comprises:
        a screen configurer configured to configure a group image screen comprising playback areas for the respective predetermined cameras sorted into the group;
        an image generator configured to extract the image frames recorded into the single group file, based on the identification information, to generate playback images; and
        an image mapper configured to map the generated playback images to the respective playback areas included in the configured group image screen,
        wherein the screen configurer is further configured to configure the playback areas of the group image screen based on a number of cameras in the group, and
    wherein the at least one processor is configured to implement the image generator configured to:
        sequentially extract the image frames included in the single group file;
        check the identification information from the headers of the extracted image frames to determine from which one of the cameras the image frames have been received; and
        for each of the predetermined cameras sorted into the group, generate a single playback image by combining the image frames received from the respective one of the predetermined cameras.

2. The data management device according to claim 1, wherein the data manager is further configured to record the image frames into which the identification information is inserted, in the single group file in a chronological order that the image frames are received.

3. The data management device according to claim 1, wherein the data manager is further configured to, in response to a selection of some cameras belonging to different groups among the cameras, for playback, record, among the received image data, image frames that are received from the selected some cameras, in the single group file.

4. The data management device according to claim 1, further comprising an input interface configured to receive setting information of a newly participating camera in the group, among the cameras.

5. The data management device according to claim 4, wherein the input interface is further configured to receive a command to add the newly participating camera to the group, and
    wherein the data manager is further configured to reconfigure the group so that the group comprises the newly participating camera, in response to the received command.

6. The data management device according to claim 5, wherein the data manager is further configured to record, among the received image data, image frames that are received from the reconfigured group, in the single group file.

7. The data management device according to claim 4, wherein the newly participating camera in the group comprises a camera belonging to another group or not belonging to any group.

8. A method for managing data, the method comprising:
  receiving image data from cameras;
  sorting predetermined cameras among the cameras into a group based on an input from a user;
  inserting identification information of the predetermined cameras into headers of image frames included in the image data received from the predetermined cameras;
  recording the image frames into which the identification information is inserted, in a single group file;
  configuring a group image screen comprising playback areas for the respective predetermined cameras sorted into the group;
  extracting the image frames recorded into the single group file, based on the identification information, to generate playback images;
  mapping the generated playback images to the respective playback areas included in the configured group image screen;
  wherein the configuring the group image screen further comprises,
    configuring the playback areas of the group image screen based on a number of cameras in the group;
    sequentially extracting the image frames included in the single group file;
    checking the identification information from the headers of the extracted image frames to determine from which one of the cameras the image frames have been received, and
    for each of the predetermined cameras sorted into the group, generating a single playback image by combining the image frames received from the respective one of the predetermined cameras.

9. The method according to claim 8, wherein the recording further comprises recording the image frames into which the identification information is inserted, in the single group file in a chronological order that the image frames are received.

10. The method according to claim 8, further comprising, in response to a selection of some cameras belonging to different groups among the cameras, for playback, recording, among the received image data, image frames that are received from the selected some cameras, in the single group file.

11. The method according to claim 8, further comprising receiving setting information of a newly participating camera in the group, among the cameras.

12. The method according to claim 11, further comprising:
  receiving a command to add the newly participating camera to the group; and
  reconfiguring the group so that the group comprises the newly participating camera, in response to the received command.

13. The method according to claim 12, further comprising recording, among the received image data, image frames that are received from the reconfigured group, in the single group file.

14. The method according to claim 11, wherein the newly participating camera in the group comprises a camera belonging to another group or not belonging to any group.

* * * * *